United States Patent
Carignan et al.

(10) Patent No.: US 10,438,634 B2
(45) Date of Patent: Oct. 8, 2019

(54) CONTENT-BASED UNIQUE MATERIAL IDENTIFIERS

(71) Applicant: AVID TECHNOLOGY, INC., Burlington, MA (US)

(72) Inventors: Donald A. Carignan, Tyngsboro, MA (US); Scott E. Kohnle, Pace, FL (US)

(73) Assignee: AVID TECHNOLOGY, INC., Burlington, MA (US)

( * ) Notice: Subject to any disclaimer, the term of this patent is extended or adjusted under 35 U.S.C. 154(b) by 902 days.

(21) Appl. No.: 13/975,654

(22) Filed: Aug. 26, 2013

(65) Prior Publication Data

US 2014/0301716 A1 Oct. 9, 2014

Related U.S. Application Data

(60) Provisional application No. 61/808,685, filed on Apr. 5, 2013.

(51) Int. Cl.
*G11B 27/30* (2006.01)

(52) U.S. Cl.
CPC .................. *G11B 27/3027* (2013.01)

(58) Field of Classification Search
None
See application file for complete search history.

(56) References Cited

U.S. PATENT DOCUMENTS

| | | | | |
|---|---|---|---|---|
| 2002/0131764 A1* | 9/2002 | David | | G06F 17/30817 386/239 |
| 2004/0085342 A1* | 5/2004 | Williams | | H04N 21/235 715/723 |
| 2006/0029065 A1* | 2/2006 | Fellman | | H04L 1/004 370/389 |
| 2007/0067309 A1* | 3/2007 | Klein, Jr. | | G06F 17/30017 |
| 2007/0217648 A1* | 9/2007 | Muehlbauer | | G11B 27/11 382/100 |
| 2011/0131298 A1* | 6/2011 | Courtemanche | | H04L 67/1095 709/219 |
| 2011/0187823 A1* | 8/2011 | Ueda | | H04N 13/00 348/43 |
| 2011/0247042 A1* | 10/2011 | Mallinson | | G06F 17/30026 725/86 |

(Continued)

OTHER PUBLICATIONS

UMID Applications in Practices, Yoshiaki Shibata and Jim Wilkinson, the 2011 annual technical conference & exhibition.*

*Primary Examiner* — Kris E Mackes
*Assistant Examiner* — Soheila (Gina) Davanlou
(74) *Attorney, Agent, or Firm* — Oliver Strimpel

(57) ABSTRACT

A unique material identifier (UMID) for a media file that was not provided with a UMID at its point of origination is generated by using the content of the file, and is independent of the time of file import or accessing. For a given item of media material, the UMID remains unchanged and uniquely identifies the item when such a file is imported or accessed multiple times. The UMID may be generated by hashing together selected portions of the metadata and essence of the media file. The amount of metadata and essence sampled is chosen to provide a high degree of assurance that the UMID will be unique, but is kept small enough so as to avoid causing a perceptible lag when the UMID is generated. In various embodiments the UMID is based purely on one or more selected portions of the media file essence.

19 Claims, 1 Drawing Sheet

(56) References Cited

U.S. PATENT DOCUMENTS

| | | | | |
|---|---|---|---|---|
| 2012/0045189 A1* | 2/2012 | Singh | ............... | G11B 27/034 386/285 |
| 2012/0263436 A1* | 10/2012 | McGrath | ............. | G11B 27/031 386/241 |
| 2012/0290578 A1* | 11/2012 | Morimoto | ........... | G06F 17/3061 707/737 |
| 2012/0308073 A1* | 12/2012 | Lahr | ................ | G06F 17/30799 382/100 |

* cited by examiner

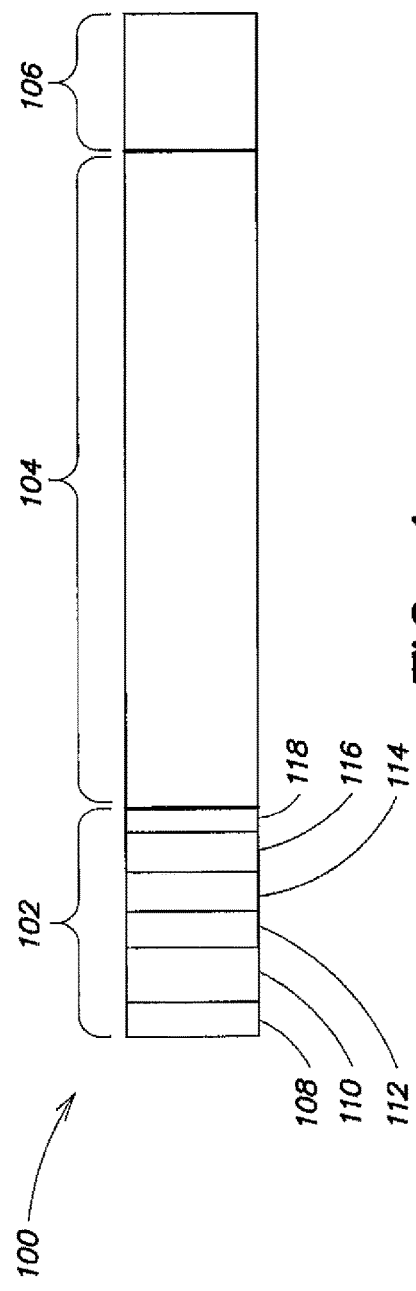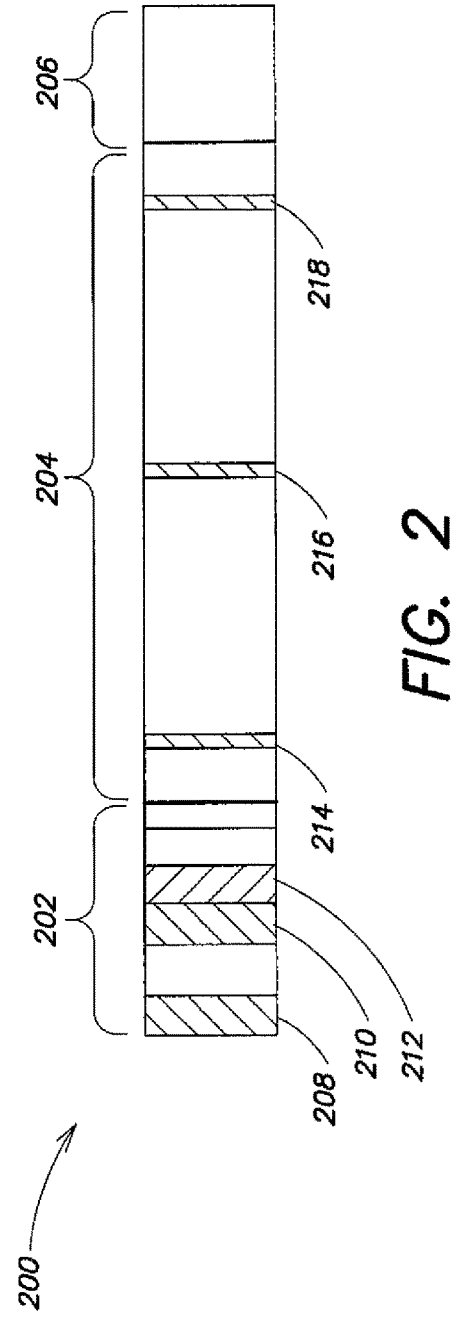

CONTENT-BASED UNIQUE MATERIAL IDENTIFIERS

CROSS REFERENCE TO RELATED APPLICATION

This application claims right of priority to and the benefit under 35 U.S.C. § 119(e) of U.S. provisional patent application Ser. No. 61/808,685, filed Apr. 5, 2013, which is incorporated herein by reference.

BACKGROUND

A Unique Material Identifier (UMID) is a signature that is used to identify media materials, such as audio and video clips. The main purpose of the UMID is to enable media creators, editors, and others to identify and locate material in storage systems, and to provide constant identification throughout production, archival storage, transmission, and dissemination of media. Ideally, UMIDs are generated at the point of material origination without reference to a central resource. The value of a UMID stems from its guaranteed one-to-one correspondence with a particular item of media source material. However, certain points of media material origination do not generate a UMID, with the consequence that UMID generation takes place at a subsequent stage in the handling of the media. In such circumstances, a given item of material may be assigned more than one UMID when imported by different devices or applications. This can produce confusion, and cause problems with media editing, media management, and archiving applications that rely on the uniqueness of a UMID.

SUMMARY

In general, the methods, systems, and computer program products described herein enable the generation of a content-based UMID for a file, such as a media clip file.

In general, in one aspect, a method of generating a UMID involves: receiving link to a digital media file that is not associated with a UMID; generating a UMID for the digital media file, wherein the UMID is based on a selected portion of media essence of the file, and wherein the UMID is independent of a time of receiving the digital media file; and associating the UMID with the digital media file.

Various embodiments include one or more of the following features. The UMID is further based on one or more metadata fields associated with the file. The one or more metadata fields include a track information field. The metadata associated with the file is based on a likelihood that the metadata distinguishes the file from other digital media files. Selection of the portion of the media essence of the file is based on a likelihood that the media essence distinguishes the file from other digital media files. The selected portion of media essence comprises media essence corresponding to temporal locations in the file of between 5 and 20 seconds from the beginning of the file and/or temporal locations of between 5 and 20 seconds before the end of the file. The selected portion of media essence comprises an amount of data in the range of 0.5 to 2 megabytes of data starting from a location near the beginning of the essence and/or starting from a location near the middle of the essence. Generating the UMID comprises using a hash function to generate the UMID from the selected portion of media essence, wherein the UMID comprises a string of a predetermined length, such as 16 bytes or 32 bytes. A delay associated with generating the UMID is less than about 100 milliseconds. The method includes receiving links to a plurality of digital media files in addition to the first-mentioned digital media file, and for each file of the plurality files: generating a UMID for the digital media file, wherein the UMID is based on a selected portion of media essence of the file, and wherein the UMID is independent of a time of receiving the digital media file; and associating the UMID with the digital media file such that a delay associated with performing the generating and associating steps for the plurality of digital media files and for the first-mentioned file is less than about 100 milliseconds.

In general, in another aspect, a computer program product includes: a computer-readable medium with computer program instructions encoded thereon, wherein the computer program instructions, when processed by a computer, instruct the computer to perform a method comprising: receiving a link to a digital media file that is not associated with a UMID; generating a UMID for the digital media file, wherein the UMID is based on a selected portion of media essence of the file, and wherein the UMID is independent of a time of receiving the digital media file; and associating the UMID with the digital media file.

BRIEF DESCRIPTION OF THE DRAWINGS

FIG. 1 is high level diagram of the structure of a digital media file.

FIG. 2 is a high level diagram of a digital media file showing exemplary portions upon which a content-based UMID is based.

DETAILED DESCRIPTION

As its name implies, a UMID is intended to serve as a unique identifier for a particular item of media material. When a camera, microphone, or software application that originates material generates a UMID that is then associated with the material throughout its lifetime, there is little opportunity for ambiguity to arise. However, many devices and applications that originate media material do not generate UMIDs. For such material, a UMID is generated when the material is imported into an application. For most media editing applications, the importing step does not actually involve import of the media material, but obtaining a link to the media material. This may be achieved by extracting metadata from the file at a given file path (link). Since standard techniques for generating UMIDs are based not only on aspects of the material itself, but also on such data as the time and date of import and a random number, the UMID generated in such circumstances defines a particular import event for the material. Thus, each time a particular item of media material from a non-UMID-generating source is imported into an application, it is given a different UMID. This destroys the one-to-one correspondence between a UMID and the material it identifies, since a given item of media material may be assigned more than one UMID. For media editing applications, such as MEDIA COMPOSER® from Avid® Technology, Inc., of Burlington, Mass., this ambiguity causes problems with media indexing and media relinking. This can be especially problematic in a production pipeline setting, in which multiple project participants, such as daily systems operators, special effects artists, and graphics artists, often import a given source media file multiple times when using different systems.

The need to distinguish the identity of a given piece of material unambiguously with a UMID is distinct from the need to validate the content of a particular file, for example to ensure that the file has not been corrupted. The latter may be achieved by using a checksum algorithm, such as a cyclic redundancy check. Files with completely different content may have the same checksum, which indicates that its purpose is quite different from that of a UMID.

Media files are sometimes identified by a digital fingerprint. The purpose of such a quantity is to determine whether two files feature the same visual or auditory content. However, it does not distinguish between files of different formats, or different shots of the same subject, and cannot be used as a unique identifier of a specific item of media material.

To overcome such problems, a UMID scheme is described that is based purely on the content of the media material, and is therefore independent of the time of import or of other parameters that do not depend on the file itself, such as a random number. As used herein, content refers to the contents of the file, which includes metadata as well as the material in the body of the file. For media files, the term content refers to the content of the various metadata fields in the file header describing various media properties, as well as the video and/or audio essence located within the file body.

FIG. 1 is high level illustration of the data structure of wrapped media file 100, such as a simple MXF file, comprising file header 102, file body 104, and file footer 106. File header 102 and file footer 106 contain metadata, and file body 104 contains media essence. Each of the header and the footer include several metadata fields, as illustrated for header 102, with header metadata fields 106, 108, 110, 112, 114, 116, and 118. Footer 106 may contain multiple metadata fields in a similar fashion. Body 104 of media file 100 comprises video and/or audio essence in either uncompressed or compressed form.

In the described embodiment, a content-based UMID is generated by using certain portions of the metadata taken from a file header and/or footer, as well as from a portion of the body of the file. For media files, the header metadata contains data describing various properties of the media in the file, and the file body contains the media essence, i.e., the video and/or audio essence. A convenient method of generating the UMID is to hash together these portions into a string of the required length, such as 16 bytes, or 32 bytes. The UMID is then associated with the file, either by creating a pointer from the UMID to the file without modifying the file itself, or by inserting the UMID into a metadata field in the header of the media file. In the former method, the pointer may be stored within one of the fields of a metadata file that is associated with the media file.

While data upon which the UMID is based may be selected from any portion of the file, it is desirable to make certain choices in order to minimize the chance of two similar but different files being assigned an identical content-based UMID, while at the same time keeping the time required to generate the UMID within acceptable limits, preferably fast enough not to introduce a lag that would be perceptible to a user when importing media files. Constraints on the UMID generation time are made more stringent by the need to maintain an imperceptible lag even when a user simultaneously imports a large number of files, such as about 1,000 files. For example, to achieve an imperceptible delay of less than 100 milliseconds when importing 1,000 files, the UMID generation time per file needs to be less than 0.1 millisecond.

The chance of assigning the same UMID to two different files can be reduced by an arbitrary amount by increasing the quantity of data that is used for the UMID, with the extreme case being the use of all the content in the file, both metadata and essence. However, for all but the smallest of files, the delay both as a result of latency and as a result of compute time becomes unacceptable as the amount of media file data used to generate the UMID increases beyond a certain threshold. It is desirable for the UMID generation time to be independent of the length of the file.

In some embodiments, the content-based UMID is generated entirely from the file body, which in the case of media files is the audio and/or video essence in the body, without sampling any of the file metadata.

Metadata associated with the file has the advantage of being more readily accessible than the essence since it may be read out directly. Some metadata fields supply signature information that contributes to the uniqueness of a UMID, such as the time the media was originally captured or generated by an application, or the number of frames in the file. However, other fields may be less useful if they refer to file properties that may not change from file to file, such as the format of the media, or descriptive metadata that describes a project for which there are multiple files. On the other hand, portions of the essence are more likely to be unique, especially if they are not near the beginning or end of the file where the essence might represent black frames or color bars that often start and end a clip.

As illustrated in FIG. 2, a scheme for generating a UMID from media file 200 with header 202, body 204, and footer 206 that balances the competing considerations discussed above may be based on the values of a plurality of metadata properties in the file header and/or footer, and on portions of the file body which contains video and/or audio essence. In the illustrated example, three metadata fields 208, 210, and 212 are selected for their probable uniqueness as well as three chunks of content taken from locations near the beginning 214, near the middle 216, and near the end 218 of file body 204. For files containing both audio and video, exemplary metadata properties of the selected metadata 208, 210, and 212 are duration-in-video-samples, audio-track-count, and video-track-count. Depending on the nature of the media content in the file and the size of the file, the chunk near the beginning is located between about 5 to 25 seconds into the clip represented by the file, and the chunk near the end is between 5 to 25 seconds before the end. In order to avoid data that straddles a frame boundary that may be the same for multiple frames, such as frame padding, the chunk is taken to be less than one frame size in length.

In various other media file embodiments, the metadata portion selected for the UMID is limited to a single metadata field, such as a track information field. The essence portion of the file used to generate the UMID may be captured from just two locations in the clip essence. The first location may start at or near the beginning of the clip, and continue through the file body until about one megabyte of data is sampled. The second location may start about half way through the clip, and likewise continue through the file body until about one megabyte of data is sampled. In further embodiments, the essence portion of the file used to generate the UMID is captured from a single location close to or at the middle of the essence, i.e., a location corresponding to a media playback time at the half way point. The essence may be captured from one or more video tracks and/or one or more audio tracks.

For very small files, such as a file containing only a single frame, such as a title frame or a still image, the essence portion sampled for the UMID may be based on the entire body of the file.

In addition to distinguishing files having different content and/or metadata, a UMID may also be used to distinguish different ways in which a user chooses to view a given file. This is achieved by including a metadata field with a parameter that is changed or ignored depending on how the user wishes to view the file. For example, if a user wishes to view a file complete with its alpha channel, a UMID based in part on the track information metadata field includes the alpha channel information along with the other track information (e.g., number of audio and video tracks). On the other hand, should a user wish to view the same file but without alpha channel information, a different UMID is generated based on the track information but ignoring the alpha channel. Thus, in effect, during subsequent editing, the system distinguishes between a file with the alpha channel and the same file without the alpha channel.

A special case arises when a file contains metadata only without any media essence. Such a "reference" file may serve to point to another file that does contain essence. In this case, a UMID may be generated on the basis of metadata from the reference file and media essence from the file being pointed to by the reference file.

The various components of the system described herein may be implemented as a computer program using a general-purpose computer system. Such a computer system typically includes a main unit connected to both an output device that displays information to a user and an input device that receives input from a user. The main unit generally includes a processor connected to a memory system via an interconnection mechanism. The input device and output device also are connected to the processor and memory system via the interconnection mechanism.

One or more output devices may be connected to the computer system. Example output devices include, but are not limited to, liquid crystal displays (LCD), plasma displays, various stereoscopic displays including displays requiring viewer glasses and glasses-free displays, cathode ray tubes, video projection systems and other video output devices, printers, devices for communicating over a low or high bandwidth network, including network interface devices, cable modems, and storage devices such as disk or tape. One or more input devices may be connected to the computer system. Example input devices include, but are not limited to, a keyboard, keypad, track ball, mouse, pen and tablet, touchscreen, camera, communication device, and data input devices. The invention is not limited to the particular input or output devices used in combination with the computer system or to those described herein.

The computer system may be a general purpose computer system which is programmable using a computer programming language, a scripting language or even assembly language. The computer system may also be specially programmed, special purpose hardware. In a general-purpose computer system, the processor is typically a commercially available processor. The general-purpose computer also typically has an operating system, which controls the execution of other computer programs and provides scheduling, debugging, input/output control, accounting, compilation, storage assignment, data management and memory management, and communication control and related services. The computer system may be connected to a local network and/or to a wide area network, such as the Internet. The connected network may transfer to and from the computer system program instructions for execution on the computer, media data such as video data, still image data or audio data, metadata, review and approval information for a media composition, media annotations, and other data.

A memory system typically includes a computer readable medium. The medium may be volatile or nonvolatile, writeable or nonwriteable, and/or rewriteable or not rewriteable. A memory system typically stores data in binary form. Such data may define an application program to be executed by the microprocessor, or information stored on the disk to be processed by the application program. The invention is not limited to a particular memory system. Time-based media may be stored on and input from magnetic, optical, or solid state drives, which may include an array of local or network attached disks.

A system such as described herein may be implemented in software or hardware or firmware, or a combination of the three. The various elements of the system, either individually or in combination may be implemented as one or more computer program products in which computer program instructions are stored on a computer readable medium for execution by a computer, or transferred to a computer system via a connected local area or wide area network. Various steps of a process may be performed by a computer executing such computer program instructions. The computer system may be a multiprocessor computer system or may include multiple computers connected over a computer network. The components described herein may be separate modules of a computer program, or may be separate computer programs, which may be operable on separate computers. The data produced by these components may be stored in a memory system or transmitted between computer systems by means of various communication media such as carrier signals.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A method of distinguishing a first digital media file from a second digital media file, the method comprising:
    at a first client hosting a first media processing software application, receiving a link to a first digital media file that is not associated with a unique material identifier (UMID);
    using the first media processing application:
        accessing the first digital media file;
        selecting a first quantity of data from a plurality of non-contiguous portions of media essence of the first digital media file; and
        generating a first UMID for the first digital media file directly from the first quantity of data, wherein selecting the first quantity of data balances requirements that a size of the first quantity of data is:
            small enough to enable the first media processing application to generate the first UMID in a time that is not perceptible to a user of the first media processing software application when accessing the first digital media file; and
            large enough to ensure an acceptable likelihood that the first UMID uniquely identifies the first digital media file;
    at a second client hosting a second media processing software application, receiving a link to a second digital media file that is not associated with a UMID;
    using the second media processing application:
        accessing the second digital media file;

selecting a second quantity of data from a plurality of non-contiguous portions of media essence of the second digital media file; and generating a second UMID for the first second digital media file directly from the second quantity of data, wherein selecting the second quantity of data balances requirements that a size of the second quantity of data is:

small enough to enable the second media processing application to generate the second UMID in a time that is not perceptible to a user of the second media processing software application when accessing the second digital media file; and large enough to ensure an acceptable likelihood that the second UMID uniquely identifies the second digital media file;

wherein each of the non-contiguous portions of the first digital media file and of the second digital media file are derived from different sets of one or more frames of media essence of the respective digital media files, and wherein the first and second UMIDs are independent of times when the first and second digital media files were received, such that the first UMID is different from the second UMID when at least one of:

the first digital media file features a first media content in a first format and the second digital media file features the first media content in a second format that is different from the first format; and the first digital media file features a first shot of a first subject and the second digital media file features a second shot of the first subject, and the first shot is different from the second shot; and associating the first and second UMIDs with their respective digital media files by at least one of:

creating a pointer from the first and second UMIDs to their respective digital media files; and writing the first and second UMIDs into a metadata field of their respective digital media files.

2. The method of claim 1, wherein the first TIMID is further based on one or more metadata fields associated with the first file.

3. The method of claim 2, wherein the one or more metadata fields include a track information field.

4. The method of claim 2, further comprising selecting the metadata associated with the first file based on a likelihood that the metadata distinguishes the first file from other digital media files.

5. The method of claim 1, further comprising selecting the plurality of non-contiguous portions of the media essence of the first file based on a likelihood that the media essence distinguishes the first file from other digital media files.

6. The method of claim 1, wherein one of the selected portions of media essence comprises media essence corresponding to temporal locations in the first file of between 5 and 20 seconds from the beginning of the first file.

7. The method of claim 6, wherein one of the selected portions of media essence further comprises media essence corresponding to temporal locations in the first file of between 5 and 20 seconds before the end of the first file.

8. The method of claim 1, wherein one of the selected portions of media essence comprises an amount of data in the range of 0.5 to 2 megabytes of data starting from a location near the beginning of the essence.

9. The method of claim 1, wherein one of the selected portions of media essence comprises an amount of data in the range of 0.5 to 2 megabytes starting from a location near the middle of the essence.

10. The method of claim 1, wherein generating the first UMID comprises using a hash function to generate the first UMID from the selected plurality of portions of media essence of the first file, wherein the first UMID comprises a string of a predetermined length.

11. The method of claim 10, wherein the predetermined length is one of 16 bytes and 32 bytes.

12. The method of claim 1, wherein a delay associated with generating the first UMID is less than about 100 milliseconds.

13. The method of claim 1, further comprising:

receiving links to a plurality of digital media files in addition to the first and second digital media files;

for each digital media file of the plurality files:

generating a UMID for the digital media file, wherein the UMID distinguishes between different versions of the digital media file, wherein the UMID is directly generated from a selected plurality of non-contiguous portions of media essence of the file, and wherein the UMID is independent of a time of receiving the digital media file; and associating the UMID with the digital media file; and wherein a delay associated with performing the generating and associating steps for the plurality of digital media files and for the first-mentioned file is less than about 100 milliseconds.

14. The method of claim 1, wherein the standard portion of the first digital media file at the beginning of the digital media file comprise color bars.

15. The method of claim 1, wherein the standard portion of the first digital media file at the beginning of the digital media file comprise black frames.

16. A computer program product comprising:

a non-transitory computer-readable medium with computer program instructions encoded thereon, wherein the computer program instructions, when processed by a computer, instruct the computer to perform a method of distinguishing a first digital media file from a second digital media file, the method comprising:

at a first client hosting a first media processing software application, receiving a link to a first digital media file that is not associated with a unique material identifier (UMID);

using the first media processing application:

accessing the first digital media file;

selecting a first quantity of data from a plurality of non-contiguous portions of media essence of the first digital media file; and generating a first UMID for the first digital media file directly from the first quantity of data, wherein selecting the first quantity of data balances requirements that a size of the first quantity of data is:

small enough to enable the first media processing application to generate the first UMID in a time that is not perceptible to a user of the first media processing software application when accessing the first digital media file; and large enough to ensure an acceptable likelihood that the first UMID uniquely identifies the first digital media file;

at a second client hosting a second media processing software application, receiving a link to a second digital media file that is not associated with a UMID;

using the second media processing application:

accessing the second digital media file;

selecting a second quantity of data from a plurality of non-contiguous portions of media essence of the second digital media file; and generating a second UMID for the first second digital media file directly from the second quantity of data, wherein selecting the second quantity of data balances requirements that a size of the second quantity of data is:

small enough to enable the second media processing application to generate the second UMID in a time that is not perceptible to a user of the second media processing software application when accessing the second digital media file; and large enough to ensure an acceptable likelihood that the second UMID uniquely identifies the second digital media file;

wherein each of the non-contiguous portions of the first digital media file and of the second digital media file are derived from different sets of one or more frames of media essence of the respective digital media files, and wherein the first and second UMIDs are independent of times when the first and second digital media files were received, such that the first UMID is different from the second UMID when at least one of:

the first digital media file features a first media content in a first format and the second digital media file features the first media content in a second format that is different from the first format; and the first digital media file features a first shot of a first subject and the second digital media file features a second shot of the first subject, and the first shot is different from the second shot; and associating the first and second UMIDs with their respective digital media files by at least one of:

creating a pointer from the first and second UMIDs to their respective digital media files; and writing the first and second UMIDs into a metadata field of their respective digital media files.

17. The method of claim 1, wherein the first client is the same as the second client.

18. The method of claim 1, wherein the first media processing software application is the same as the second media processing software application.

19. The method of claim 1, wherein the first media processing application is a video editing application.

* * * * *

UNITED STATES PATENT AND TRADEMARK OFFICE
CERTIFICATE OF CORRECTION

PATENT NO. : 10,438,634 B2
APPLICATION NO. : 13/975654
DATED : October 8, 2019
INVENTOR(S) : Donald A. Carignan et al.

Page 1 of 1

It is certified that error appears in the above-identified patent and that said Letters Patent is hereby corrected as shown below:

In the Claims

Claim 1, at Column 7, Line 4:
Replace "generating a second UMID for the first second digital"
With --generating a second UMID for the second digital--

Claim 2, at Column 7, Line 43:
Replace "The method of claim 1, wherein the first TIMID is"
With --The method of claim 1, wherein the first UMID is--

Claim 15, at Column 9, Line 9:
Replace "generating a second UMID for the first second digital"
With --generating a second UMID for the second digital--

Signed and Sealed this
Twenty-fourth Day of March, 2020

Andrei Iancu
*Director of the United States Patent and Trademark Office*